United States Patent
Wada et al.

[11] Patent Number: 5,936,981
[45] Date of Patent: Aug. 10, 1999

[54] WAVELENGTH SELECTABLE LASER OSCILLATOR IN WAVELENGTH TUNABLE LASER

[75] Inventors: Satoshi Wada; Kazuyuki Akagawa; Hideo Tashiro, all of Miyagi, Japan

[73] Assignee: Rikagaku Kenkyusho, Saitama, Japan

[21] Appl. No.: 08/848,218

[22] Filed: Apr. 29, 1997

[30] Foreign Application Priority Data

Apr. 30, 1996 [JP] Japan .................................. 8-132847

[51] Int. Cl.⁶ ........................................................ H01S 3/10
[52] U.S. Cl. .............................. 372/13; 372/20; 372/49; 372/93; 372/100
[58] Field of Search ................................. 372/13, 20, 25, 372/93, 92, 100, 49

[56] References Cited

U.S. PATENT DOCUMENTS

| 4,159,453 | 6/1979 | Brandt et al. ........................... 372/100 |
| 4,894,831 | 1/1990 | Alfrey ....................................... 372/93 |

OTHER PUBLICATIONS

"Electronic Tuning of a Dye Laser Using the Acousto–Optic Filter" by D.J. Taylor et al., *Applied Physics Letters*, vol. 19, No. 8, pp. 269–271, Oct. 15, 1971.

"Widely Tunable 90° Phase–Matched KTP Parametric Osillator" by K. Kato et al., *Optics Letters*, vol . 17, No. 3, pp. 178–179, Feb 1, 1992.

Isaenko Yu Zh et al., Sov. J. Quantum Electron., 18(10), Oct. 1988 (USSR).

J. L. Lambert, 2301 NTIS Tech Notes, Oct. 1991 (USA).

E. Schweicher et al., 8251 Revue HF Tijdschrift XIV (1988) No. 3/4 (BE) (No Month).

S. Wada et al., Optics Letters, May 15, 1996, vol. 21, No. 10, Opt. Soc. Am. (USA).

*Primary Examiner*—James W. Davie

[57] ABSTRACT

An object of the present invention is to provide a wavelength selectable laser oscillator in wavelength tunable laser by which the rate of repetitive pulse oscillation of laser beam in a laser resonator can be markedly increased in comparison with that of conventional ones, besides excitation input can be decreased, and in addition, speed-up of wavelength tuning speed can be achieved, whereby flexibility is remarkably elevated in case of practicing the wavelength selectable laser oscillator. The wavelength selectable laser oscillator in wavelength tunable laser comprises a laser resonator composed of opposed mirrors each having a prescribed reflectivity; a wavelength tunable laser medium disposed in the laser resonator and capable of laser oscillation in a wavelength zone of a prescribed range; an acousto-optical crystal disposed in the laser oscillator and to which is inputted the outgoing light from the wavelength tunable laser medium; an acoustic wave inputting means mounted on the acousto-optical crystal and for inputting an acoustic wave to the acousto-optical crystal; an optical element disposed in the laser resonator and for correcting dispersion of the diffracted light outputted from the acousto-optical crystal; and a pulse excitation laser for inputting excitation laser beam into the laser resonator.

22 Claims, 7 Drawing Sheets

WAVELENGTH SELECTABLE LASER OSCILLATOR IN WAVELENGTH TUNABLE LASER

BACKGROUND OF THE INVENTION

1. Field of the Invention

The present invention relates to a wavelength selectable laser oscillator in wavelength tunable laser, and more particularly to a wavelength selectable laser oscillator in wavelength tunable laser by which highly repeated oscillation of laser beam in a laser resonator can be realized.

2. Description of the Related Art

As a wavelength tunable laser which directs to realization of pulsed oscillation in a laser resonator for laser beam, for example, a flash-lamp-excitation Q-switch YAG laser excited titanium-sapphire (Ti:Al$_2$O$_3$) laser has heretofore been known.

In a flash-lamp-excitation Q-switch YAG laser excited titanium-sapphire laser, the pulse repetition rate is determined by the rate of lighting the flash-lamp, since the YAG laser is operated by a Q-switch-pulsed mode based on flash-lampexcitation.

In these circumstances, since the rate of lighting a flash-lamp is usually around 1 Hz to 50 Hz, there is a limit for increasing the pulse repetition rate of the laser that was excited by the aforesaid flash-lamp excitation laser. Accordingly, there is a need for a wavelength tunable laser by which much higher rates of pulse repetition can be achieved for laser beam.

Furthermore, the aforesaid flash-lamp excitation Q-switch YAG laser excited titanium-sapphire laser requires high excitation input (in general, around 20 mJ/pulse is required as the excitation energy), and the wavelength tuning speed thereof is low, so that it involves a problem of having poor flexibility in case of practicing the laser.

OBJECT AND SUMMARY OF THE INVENTION

The present invention has been made in view of the problems as described above involved in the prior art. Accordingly, an object of the present invention is to provide a wavelength selectable laser oscillator in wavelength tunable laser by which pulse repetition rate of the laser can be markedly increased in comparison with that of conventional ones, besides excitation input can be decreased, and in addition, speed-up of wavelength tuning speed can be achieved, whereby flexibility is remarkably elevated in case of practicing the wavelength selectable laser oscillator.

In order to attain the above described objects, the wavelength selectable laser oscillator in wavelength tunable laser according to the present invention is characterized by comprising a laser resonator composed of opposed mirrors each having a prescribed reflectivity; a wavelength tunable laser medium disposed in the aforesaid laser resonator and capable of laser oscillation in a wavelength zone of a prescribed range; an acousto-optical crystal disposed in the aforesaid laser oscillator and to which is inputted the outgoing light from the aforesaid wavelength tunable laser medium; an acoustic wave inputting means mounted on the aforesaid acousto-optical crystal and for inputting an acoustic wave to the aforesaid acousto-optical crystal; and a pulse excitation laser for inputting excitation laser beam into the aforesaid laser resonator.

Furthermore, the wavelength selectable laser oscillator in wavelength tunable laser according to the present invention is characterized by comprising a laser resonator composed of opposed mirrors each having a prescribed reflectivity; a wavelength tunable laser medium disposed in the aforesaid laser resonator and capable of laser oscillation in a wavelength zone of a prescribed range; an acousto-optical crystal disposed in the aforesaid laser oscillator and to which is inputted the outgoing light from the aforesaid wavelength tunable laser medium; an acoustic wave inputting means mounted on the aforesaid acousto-optical crystal and for inputting an acoustic wave to the aforesaid acousto-optical crystal; an optical element disposed in the aforesaid laser resonator and for correcting dispersion of the diffracted light outputted from the aforesaid acousto-optical crystal; and a pulse excitation laser for inputting excitation laser beam into the aforesaid laser resonator.

In this case, the aforesaid pulse excitation laser may be composed of a highly repetitive CW-Q-switch solid state laser, and this highly repetitive CW-Q-switch solid state laser may be composed of a laser-diode-excited highly repetitive solid state laser.

Further, the aforesaid laser-diode-excited highly repetitive solid state laser may be specifically composed of a CW-Q-switch pulse Nd:YLF laser, a CW-Q-switch pulse Nd:YLF laser, a CW-Q-switch pulse YAG laser or the like.

On one hand, the aforesaid laser resonator may be composed in the form of a laser resonator of Z-holding type, or a laser resonator of X-holding type.

On the other hand, the aforesaid wavelength tunable laser medium may be arranged in such that the incident end surface thereof has been Brewster-cut, and the aforesaid incident end surface is disposed with respect to the optical path inside the aforesaid laser resonator at the Brewster angle.

Moreover, the aforesaid wavelength tunable laser medium may be arranged in such that a non-reflecting coating has been applied to the incident end surface thereof, and the aforesaid incident end surface is disposed vertically with respect to the optical path inside the aforesaid laser resonator.

Still further, one of the opposed mirrors composed of the aforesaid laser resonator may be replaced by a specific coating formed on the end surface of the aforesaid wavelength tunable laser medium.

In the wavelength selectable laser oscillator in wavelength tunable laser according to the present invention, an excitation volume due to the excitation laser in the wavelength tunable laser medium is adapted to match to an optical mode volume inside the laser resonator to elevate the efficiency, so that the excitation input power is reduced, whereby the laser oscillator can be applied to a highly repetitive pulsed excitation laser.

Furthermore, the wavelength selectable laser oscillator in wavelength tunable laser according to the present invention is arranged in such that the outgoing light from the wavelength tunable laser medium is inputted to the acousto-optical crystal, and when an acoustic wave is inputted the aforesaid acousto-optical crystal by the acoustic wave inputting means, a wavelength of the outgoing light from the wavelength tunable laser medium is selected, whereby speed-up of wavelength tuning speed of the outgoing laser beam from the wavelength selectable laser oscillator in wavelength tunable laser can be achieved.

In these circumstances, the selection of wavelength for the wavelength selectable laser oscillator in wavelength tunable laser according to the present invention has been applied as a result of paying its attention to the fact that when an acoustic wave is allowed to generate in an acousto-optical crystal having birefrigent property such as TeO$_2$ crystal and the like, the polarizing plane of diffracted light having a specified wavelength in response to a frequency of the aforesaid acoustic wave among the light rays inputted to the aforesaid crystal comes to be orthogonal to the polarizing plane of non-diffracted light, besides an outgoing angle of the aforesaid diffracted light declines with respect to an outgoing angle of the non-diffracted light so as to differ remarkably therefrom.

FIG. 1 is a conceptual diagram illustrating a wavelength selecting action utilizing a polarizing action of light having a specified wavelength by means of acoustic wave wherein incident light having wavelength λi and angular frequency ωi is inputted to an acousto-optical crystal 100 having birefringent property. In this case, when acoustic wave 104 having frequency ω a is applied into the acousto-optical crystal 100, diffracted light 106 is obtained.

With respect to the diffracted light 106 which is a light ray component diffracted in the above described acousto-optical crystal 100, when a total reflection mirror 110 and a mirror having a prescribed transmittivity on the outgoing side 112 are disposed, a laser resonator is constituted in which the diffracted light reciprocates between the total reflection mirror 110 and the mirror on the outgoing side 112.

In this case, a wavelength of the diffracted light 106 is decided by a frequency of the acoustic wave 104 generated in the acousto-optical crystal 100. Accordingly, for instance, a piezoelectric element driven by an RF power source is attached to the acousto-optical crystal 100, and the piezoelectric element is driven by the RF power source to cause strain in this piezoelectric element, whereby the acoustic wave 104 having a frequency in response to the strain is inputted to the acousto-optical crystal 100, so that selectable control of laser wavelength becomes possible by controlling the frequency of the RF power source.

On the other hand, diffraction efficiency to the diffracted light 106 is determined by the intensity of acoustic wave, so that when input power of the RF power source is controlled, it becomes possible to control loss of the laser resonator, and then to control to vary the laser output.

However, since a diffraction angle α 109 is not perfectly constant with respect to a wavelength of the diffracted light, a range of wavelength within which a laser resonator can be constituted is narrow due to vertical reflection of the total reflection mirror 110 with respect to the diffracted light 106. Thus, an angle for disposing the total reflection mirror 110 must be adjusted little by little for oscillating laser within a wide region, so that there is such a fear that the adjusting operation therefore becomes complicated from practical point of view. For this reason, it is necessary for correcting deflections of the diffraction angle α 109 by any means to widen the tuning range of wavelength without changing the angle of the total reflection mirror 110 disposed.

As a means for correcting the deflections of the diffraction angle α 109, for example, there is the one wherein an optical element which disperses wavelength of light such as a triangular prism or the like may be employed to set the same in such that light rays having a deflection angle Δα defined by wavelengths λ1 and λ2 advance substantially parallelly after passing through the triangular prism. As a result, it becomes possible to always input the diffracted light 106 normally with respect to the total reflection mirror 110, whereby a laser resonator used for a wide wavelength zone can be constituted.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

The manners of practice of the wavelength selectable laser oscillator in wavelength tunable laser according to the present invention will be described in detail hereinafter in conjunction with the accompanying drawings.

Figure 2:
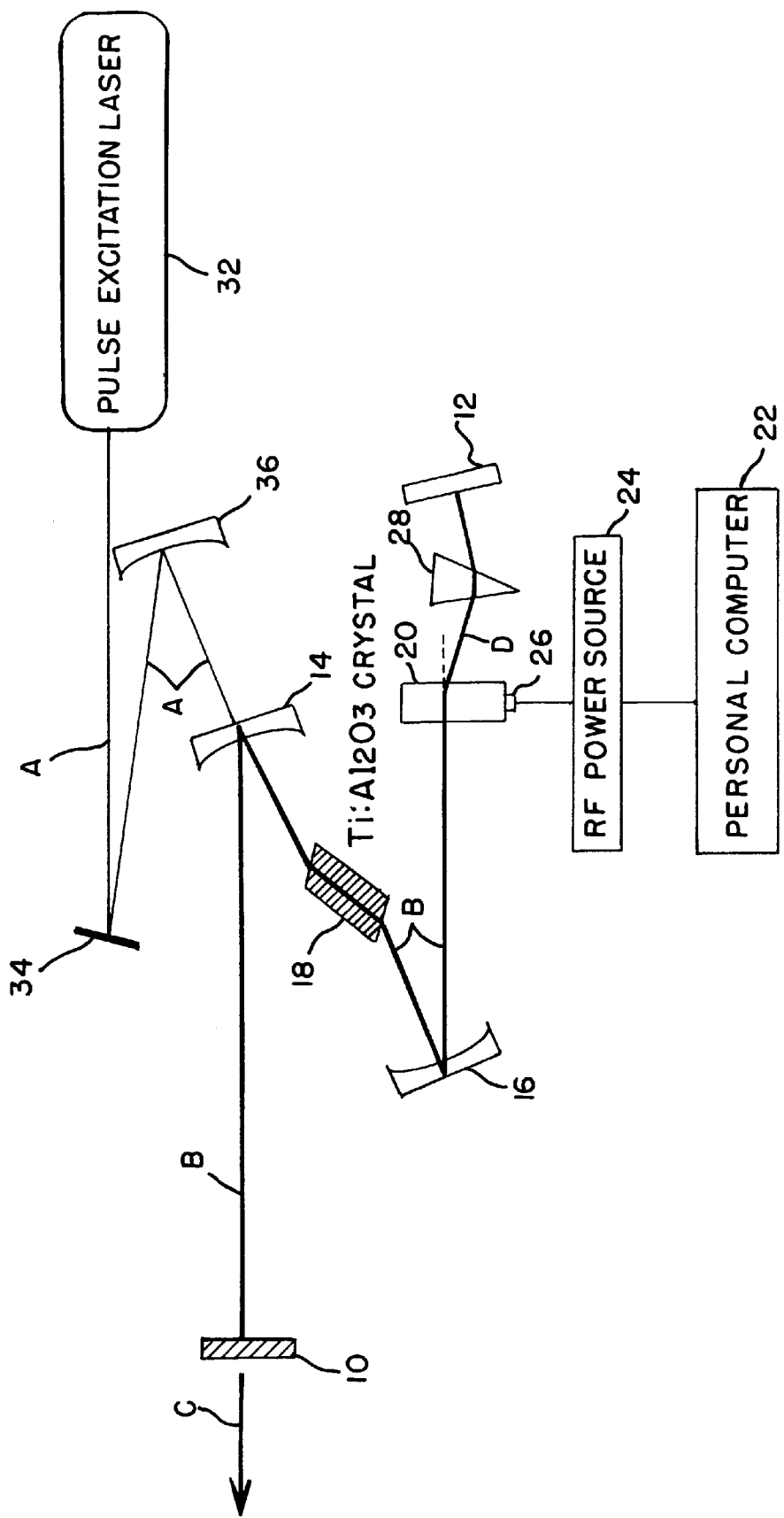
FIG. 2 is a schematic constitutional diagram for explaining a first manner of practice of the wavelength selectable laser oscillator in wavelength tunable laser according to the present invention.

Referring to FIG. 2, it is a schematic constitutional diagram for explaining the first manner of practice of the wavelength selectable laser oscillator in wavelength tunable laser according to the present invention.

In this wavelength selectable laser oscillator in wavelength tunable laser, a so-called Z-holding type laser resonator wherein an optical path of the light reciprocating inside the laser resonator exhibits a "Z"-shaped path is used. This laser resonator of Z-holding type is composed of a mirror having a prescribed transmittivity on the outgoing side 10 and a total reflection mirror 12.

Moreover, the laser resonator of Z-holding type is provided with a first intermediate mirror 14 to which is inputted excitation laser beam A, besides which reflects totally the light B reciprocating between the mirror on the outgoing side 10 and the total reflection mirror 12 as well as with a second intermediate mirror 16 reflecting totally the light B reciprocating between the mirror on the outgoing side 10 and the total reflection mirror 12, and further the laser resonator is arranged in such that the optical path of the light B reciprocating inside the laser resonator exhibits a "Z"-shaped path.

Between the first intermediate mirror 14 and the second intermediate mirror 16 on the optical path of the laser resonator is disposed, as a wavelength tunable laser medium, a Ti:Al$_2$O$_3$ laser crystal 18 the incident end surface thereof for incident light has been Brewster-cut in such that the incident end surface is of a Brewster angle wherein reflection of the incident light becomes zero, so that laser oscillation is generated by coaxial excitation in the longitudinal direction due to excitation laser beam A.

Furthermore, an acousto-optical crystal 20 being the one as a crystal for selecting wavelength and having birefringent property is disposed between the second intermediate mirror 16 and the total reflection mirror 12 on the optical path of the laser resonator.

In addition, to the acousto-optical crystal 20 is attached, as an acoustic wave inputting means, a piezoelectric element 26 driven by an RF power source 24 a frequency of which is controlled by a personal computer 22. Thus, when the piezoelectric element 26 is driven by the RF power source 24 wherein the frequency thereof has been set in a random access manner in accordance with the control of the personal computer 22 to thereby cause strain in the piezoelectric element 26, based on this strain of the piezoelectric element 26, acoustic wave having a frequency in response to the above described strain is inputted to the acousto-optical crystal 20. As a result, the acousto-optical crystal 20 diffracts only the light D in response to the acoustic wave inputted.

Accordingly, inputting of acoustic wave to the acousto-optical crystal 20 is controlled by the personal computer 22 in such a manner that only the light B having a wavelength of the outgoing laser beam C which is intended to be outputted from the mirror on the outgoing side 10 by means of the piezoelectric element 26 can be outputted as the diffracted light D which has been diffracted by the acousto-optical crystal 20 in a prescribed direction thereby being capable of making laser oscillation.

Furthermore, a dispersion correcting prism 28 for correcting dispersion of the diffracted light D is disposed between the acousto-optical crystal 20 and the total reflection mirror 12. By the use of the dispersion correcting prism 28, directivity of outgoing laser beam C can keep constant.

In the wavelength selectable laser oscillator in wavelength tunable laser, a pulse excitation laser 32 is used as the laser for inputting excitation light A to the laser resonator. As the pulsed excitation laser 32, a highly repeated CW-Q-switch may be used, and an example thereof includes a compact, laser-diode (LD)-excited highly repetitive solid state laser and the like. More specifically, CW-Q-switch pulsed YAG laser, CW-Q-switch pulsed Nd:YLF laser and the like may be employed.

The excitation laser light A produced by the pulse excitation laser 32 is reflected to a total reflection beam-condensing mirror 36 by the total reflection mirror 34 to be collected by the total reflection beam-condensing mirror 36, and is inputted through the first intermediate mirror 14 so as to pump the Ti:Al$_2$O$_3$ 18 by coaxial excitation in the longitudinal direction.

In the above described arrangement, to obtain outgoing laser beam C, the Ti:Al$_2$O$_3$ laser crystal 18 is excited by utilizing the excitation laser beam A inputted by the pulse excitation laser 32. According to the principle described above, a frequency of the RF power source 24 is controlled by the personal computer 22 to vibrate the piezoelectric element 26 in response to a wavelength of the outgoing laser beam C which is desired to be outputted from the mirror on the outgoing side 10.

In the situation described above, the outgoing light having a wavelength in response to the frequency of the RF power source 24 among the outgoing light rays outputted from the Ti:Al$_2$O$_3$ laser crystal 18, which are derived from the one inputted to the acousto-optical crystal 20 and belonging to a wide range of wavelength zone, is diffracted in a prescribed direction to be outputted from the acousto-optical crystal 20 as the diffracted light D. Furthermore, the diffracted light D outputted from the acousto-optical crystal 20 in a diffracted state along a prescribed direction is inputted to the total reflection mirror 12 through the dispersion correcting prism 28, so that the light inputted is reflected by the total reflection mirror 12, whereby the resulting light reciprocates inside the laser resonator along the "Z"-shaped optical path.

As a result, only the light having a wavelength in response to a frequency of the RF power source 24 is amplified to generate laser oscillation, whereby only the outgoing laser beam C having the aforesaid wavelength can be outputted from the laser resonator.

As described above, selection for a wavelength of outgoing laser beam C can be realized in control of the personal computer 22 by selecting a frequency of the RF power source 24 to vibrate the piezoelectric element 26 by means of the RF power source 24. Accordingly, a rapid and random selection of a wavelength of the outgoing laser beam C is possible, so that a wavelength selectable speed of the outgoing laser beam can be elevated.

Moreover, since the dispersion correcting prism 28 is disposed, dispersion of a diffraction angle of the diffracted light D is corrected. If there is dispersion in a diffraction angle of the diffracted light D, an optical path of the light changes inside the laser resonator, whereby a wavelength selectable zone is limited. In this respect, however, when the dispersion correcting prism 28 is provided, the problem as described above can be eliminated.

Besides, a pulse excitation laser 32 is employed in place of a conventional solid state laser wherein flash-lamp excitation is utilized in the present invention, whereby excitation laser beam A is produced. As a result, the number of pulses per unit time in repeating can be remarkably increased as compared with that of the prior art, and further the system can be miniaturized.

In addition, the constitution of the laser resonator is constituted into Z-holding type, and it is arranged in such that the excitation laser beam A is collected by the total reflection beam-condensing mirror 36 to input the same to the Ti:Al$_2$O$_3$ laser crystal 18. Hence, laser oscillation can be made sufficiently by even the excitation laser beam A derived from the pulse excitation laser 32 having low excitation input power in comparison with a conventional pulse laser wherein flash-lamp excitation is utilized.

Next, an experimental example wherein the wavelength selectable laser oscillator in wavelength tunable laser shown in FIG. 2 is utilized will be described.

In this experiment, a CW-Q-switch pulse Nd:YLF laser is used as the pulse excitation laser 32, and the second harmonics are employed for the excitation laser beam A. In this case, a wavelength of the excitation laser A, repeat of pulse, and the maximum output per pulse are 523 nm, 1 kHz, and 200 μJ, respectively.

Furthermore, a radius of the total reflection beam-condensing mirror 36 is 200 mm, a radius of the first intermediate mirror 14 as well as of the second intermediate mirror 16 is 100 mm, respectively, and the reflectivity of the mirror on the outgoing side is 97% (i.e., 3% transmittivity).

In the laser resonator of Z-holding type shown in the wavelength selectable laser oscillator in wavelength tunable laser of FIG. 2, a resonator mode volume is condensed down up to several tens microns by means of the Ti:Al$_2$O$_3$ laser crystal 18, and the excitation laser beam A is collected to this region thus narrowed by the total reflection beam-condensing mirror 36, whereby elevation of an excitation efficiency is intended.

Figure 3:
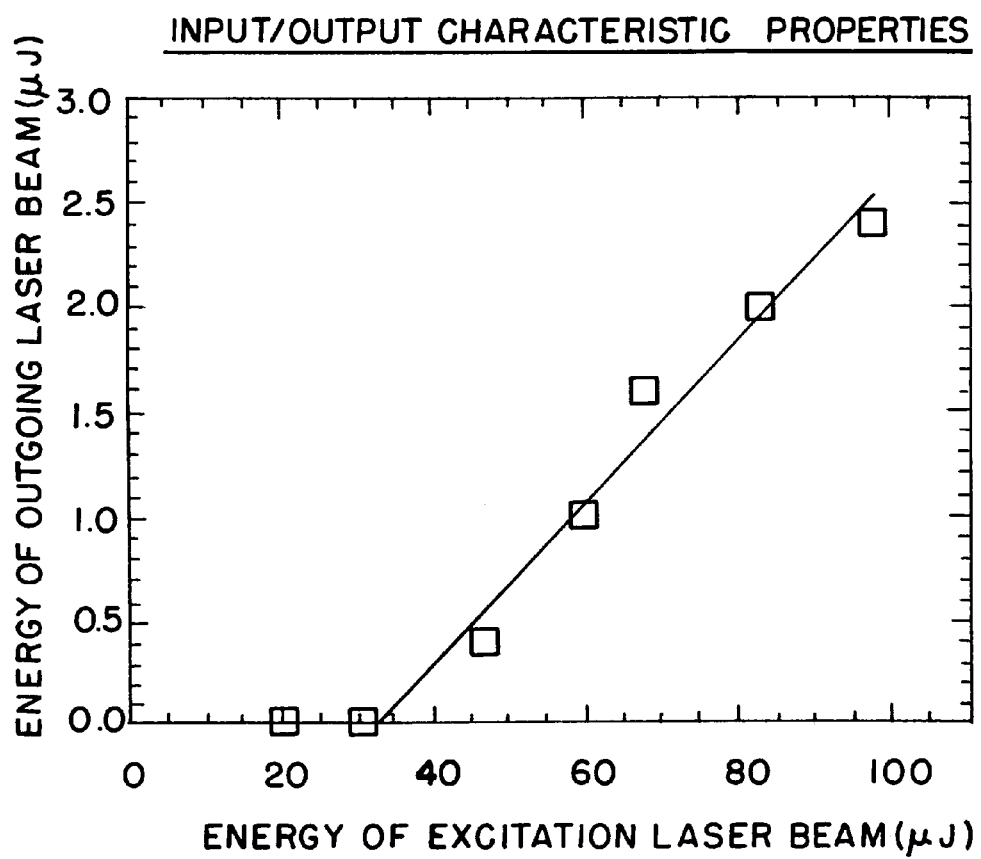
FIG. 3 is a graphical representation indicating input/output characteristic properties between the energy of excitation laser beam (input) and the energy of outgoing laser beam (output) in the experiment wherein the wavelength selectable laser oscillator in wavelength tunable laser according to the first manner of practice of the present invention is utilized.

In the constitution of the above described experiment, input/output characteristic properties of (input) energy of the excitation laser beam A and (output) energy of the outgoing laser beam C in the case where a wavelength of the output laser beam C is fixed to 800 nm are indicated in FIG. 3. As is apparent from FIG. 3, when energy of the excitation laser beam A becomes about 40 μJ per pulse, laser oscillation reaches its threshold value in this wavelength tunable laser system.

Figure 4:
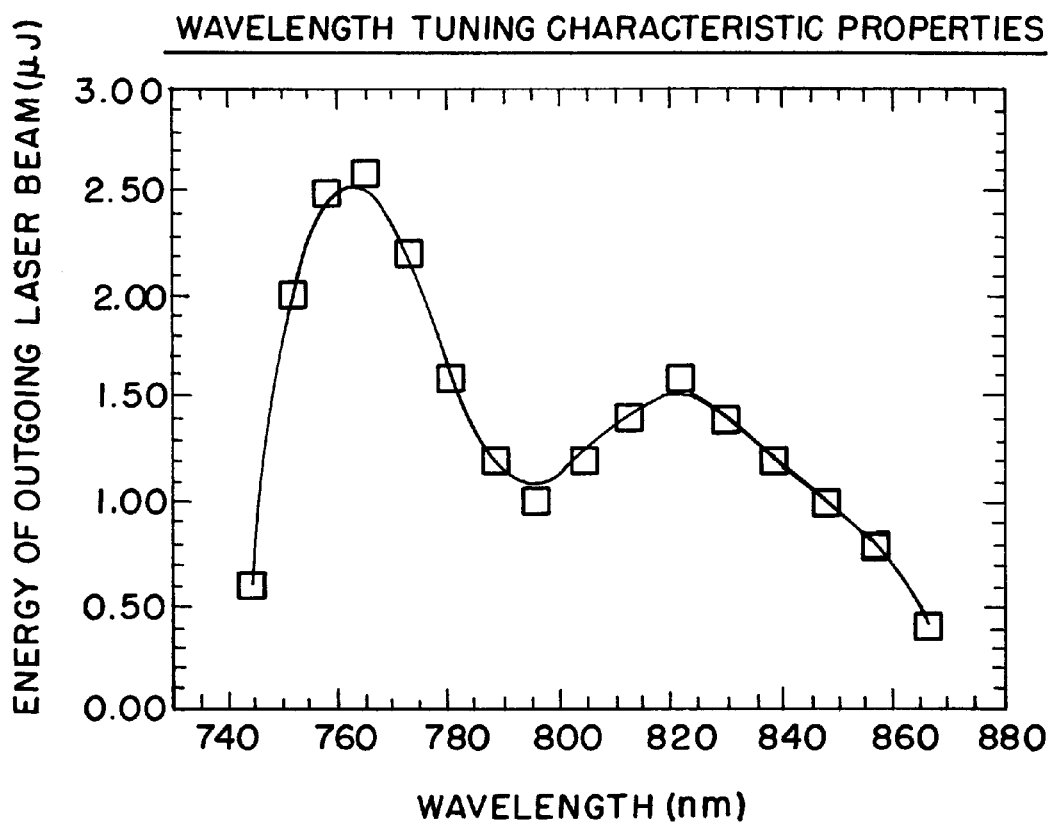
FIG. 4 is a graphical representation indicating wavelength selectable characteristic properties in the experiment wherein the wavelength selectable laser oscillator in wavelength tunable laser according to the first manner of practice of the present invention is utilized.

Moreover, FIG. 4 indicates wavelength selectable characteristic properties in the case where energy of the excitation laser beam C is 100 μJ. As is apparent from FIG. 4, a wavelength tuning ranges from about 740 nm to about 870 nm.

Since the dispersion correcting prism 28 is provided, observed variations in beam directions by tuning a wavelength of laser came to be perfectly less than the observation limit.

Figure 5:
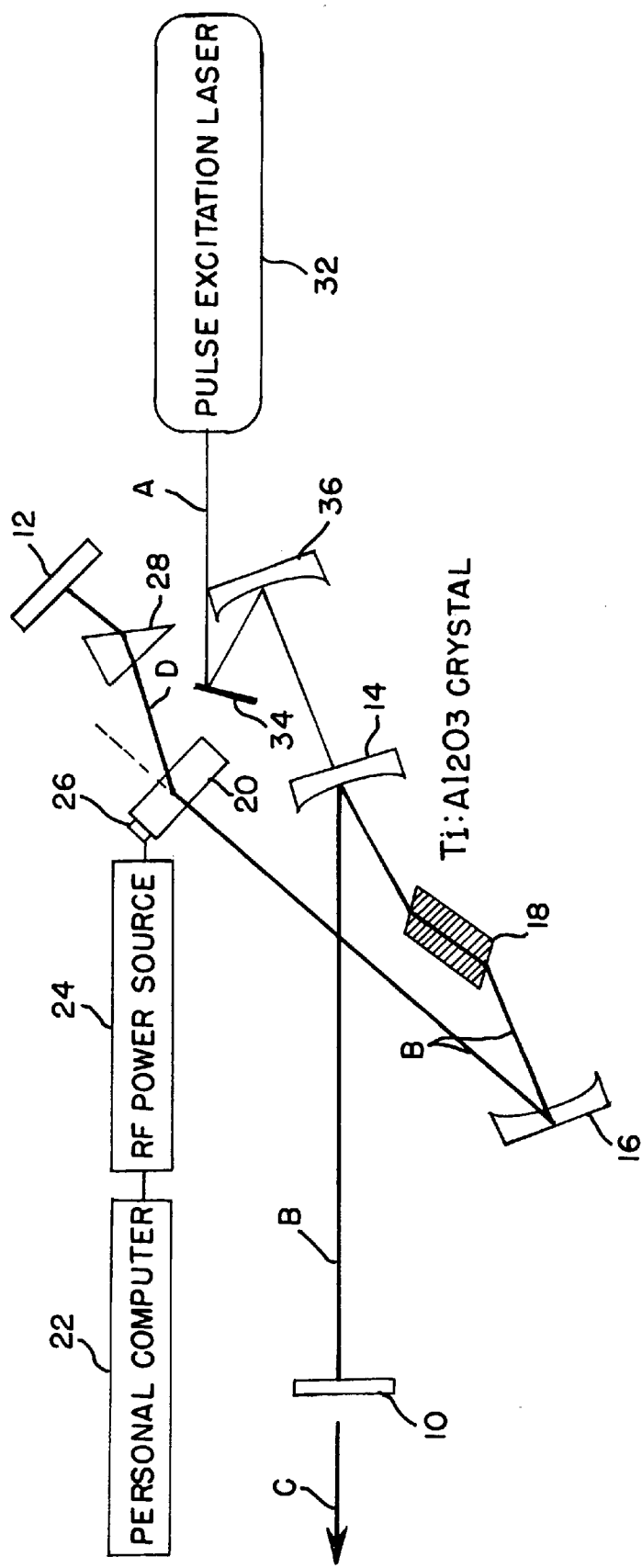
FIG. 5 is a schematic constitutional diagram for explaining a second manner of practice of the wavelength selectable laser oscillator in wavelength tunable laser according to the present invention.

FIG. 5 is a schematic constitutional diagram for explaining the second manner of practice of the wavelength selectable laser oscillator in wavelength tunable laser according to the present invention wherein the same reference characters designate the same or equivalent components as or to those of FIG. 2 showing the first manner of practice of the wavelength selectable laser oscillator in wavelength tunable laser according to the present invention, so that the detailed explanation therefore will be omitted.

The wavelength selectable laser oscillator in wavelength tunable laser of the second manner of practice differs only from that of the first manner of practice in the point that the constitution of the laser resonator is formed into a so-called X-holding type.

In also the laser resonator of X-holding type used in the wavelength selectable laser oscillator in wavelength tunable laser of the second manner of practice, since the excitation laser beam A is collected by the total reflection beam-condensing mirror 36 to be inputted to the Ti:Al$_2$O$_3$ laser crystal 18, efficient laser oscillation can be produced by even the excitation laser beam A having low excitation input power derived from the pulse excitation laser 32 in comparison with that of a conventional ion laser wherein flash-lamp excitation or discharge excitation is utilized.

In addition to the above, by the use of this laser resonator of X-holding type, the constitution thereof can be made more compact than that of a laser resonator of Z-holding type.

Figure 6:
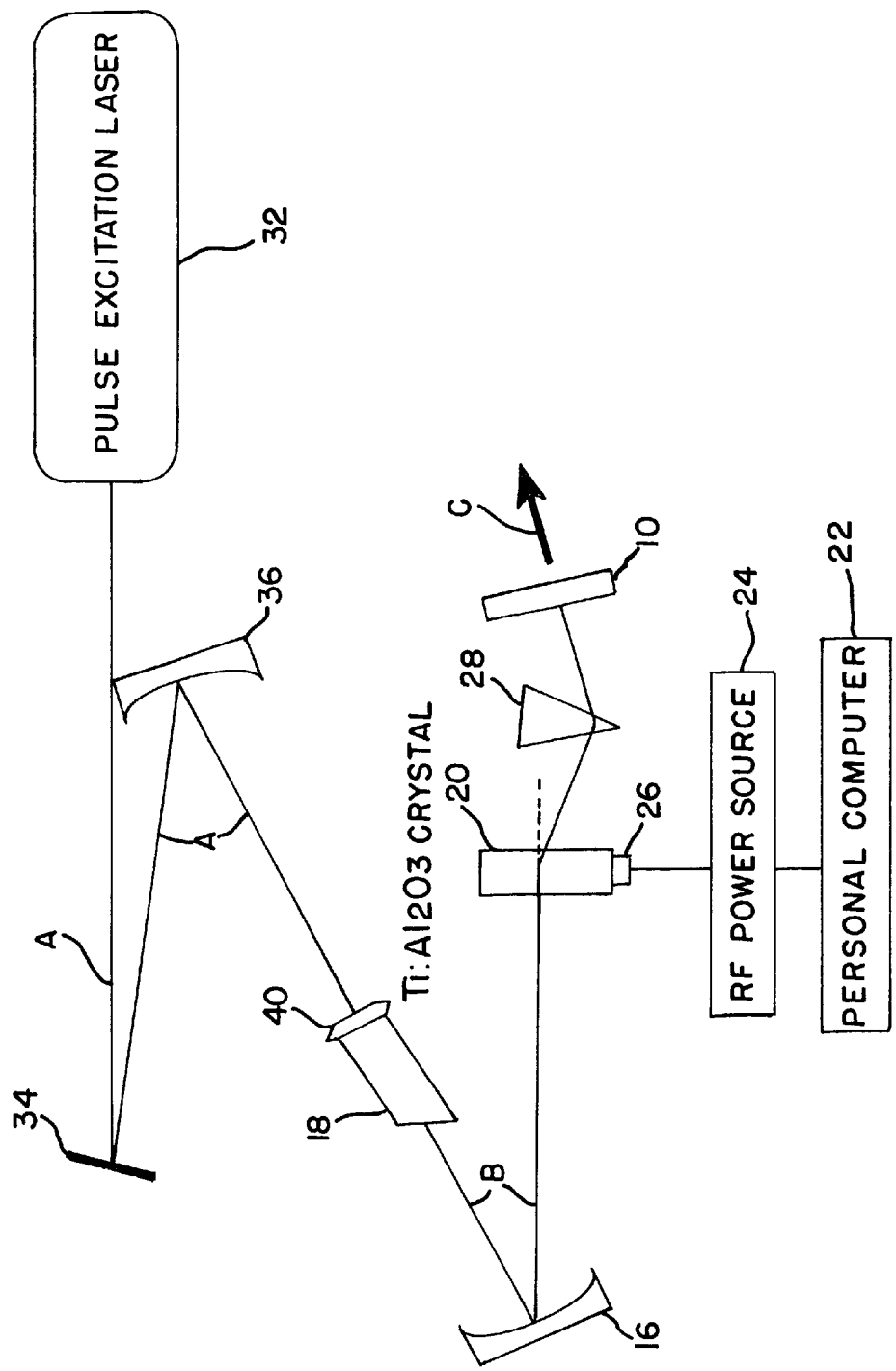
FIG. 6 is a schematic constitutional diagram for explaining a third manner of practice of the wavelength selectable laser oscillator in wavelength tunable laser according to the present invention.

FIG. 6 is a schematic constitutional diagram for explaining the third manner of practice of the wavelength selectable laser oscillator in wavelength tunable laser according to the present invention wherein the same reference characters designate the same or equivalent components as or to those of FIG. 2 showing the first manner of practice of the wavelength selectable laser oscillator in wavelength tunable laser according to the present invention, so that the detailed explanation therefore will be omitted.

Figure 1:
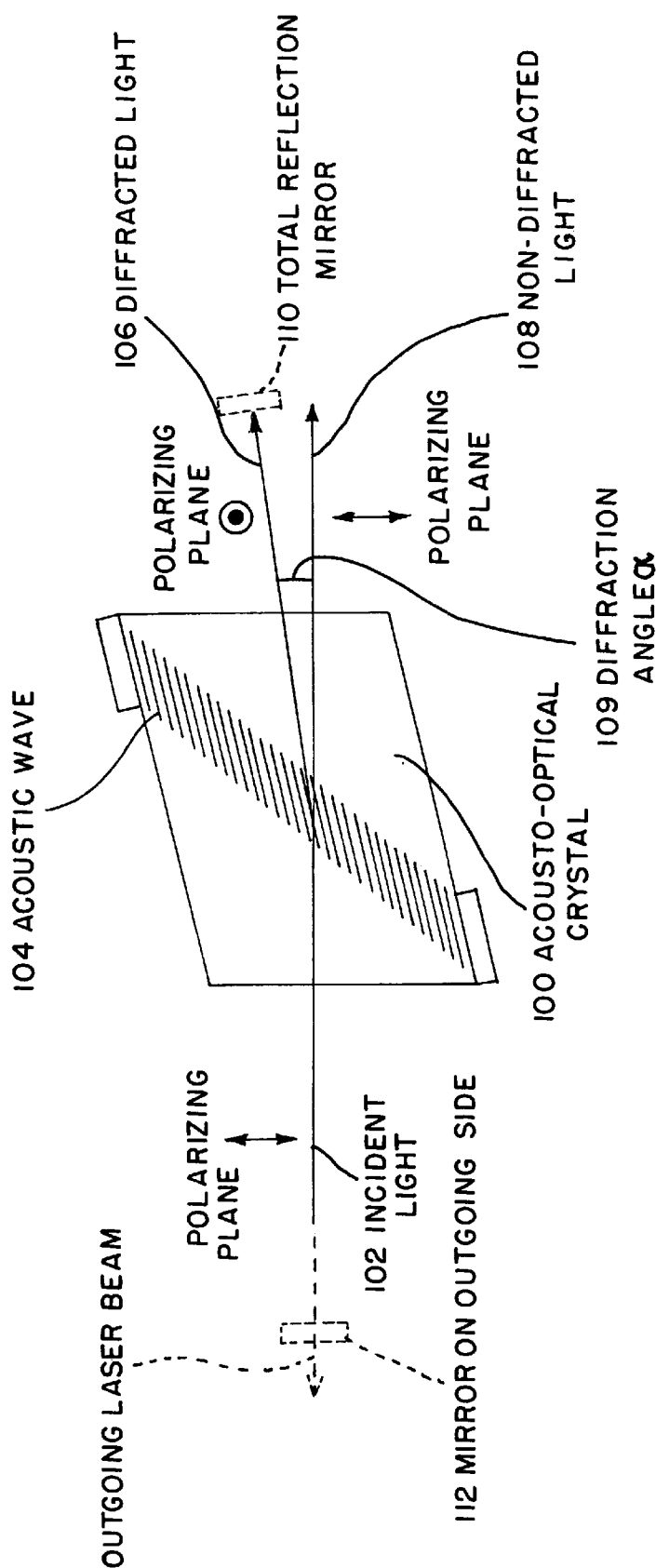
FIG. 1 is a conceptual diagram illustrating a wavelength selecting action utilizing a diffraction function of light having a specified wavelength by means of acoustic wave.

The wavelength selectable laser oscillator in wavelength tunable laser of the third manner of practice differs from that of the first manner of practice only in the point that the total reflection mirror 12 of FIG. 1 is replaced by a mirror on the outgoing side 10, and at the same time, in place of removing the mirror on the outgoing side 10 and the first intermediate mirror 14 in FIG. 1, such an arrangement that excitation laser beam A is inputted to the end surface of the Ti:Al$_2$O$_3$ laser crystal 18 on the side to which the excitation laser beam A is inputted, besides a specific coating 40 for reflecting the light outputted from the Ti:Al$_2$O$_3$ laser crystal 18 is applied is added to the modification described herein.

Thus, in the wavelength selectable laser oscillator in wavelength tunable laser of the third manner of practice, a laser resonator is composed of the specific coating 40 and the mirror on the outgoing side 10.

For this reason, according to the wavelength selectable laser oscillator in wavelength tunable laser of the third manner of practice, the number of components in this third manner of practice can be reduced in comparison with that of the wavelength selectable laser oscillator in wavelength tunable laser of the first manner of practice as well as with that of the second manner of practice, whereby the whole system can be miniaturized, besides decrease in the cost therefore can be achieved.

Figure 7:
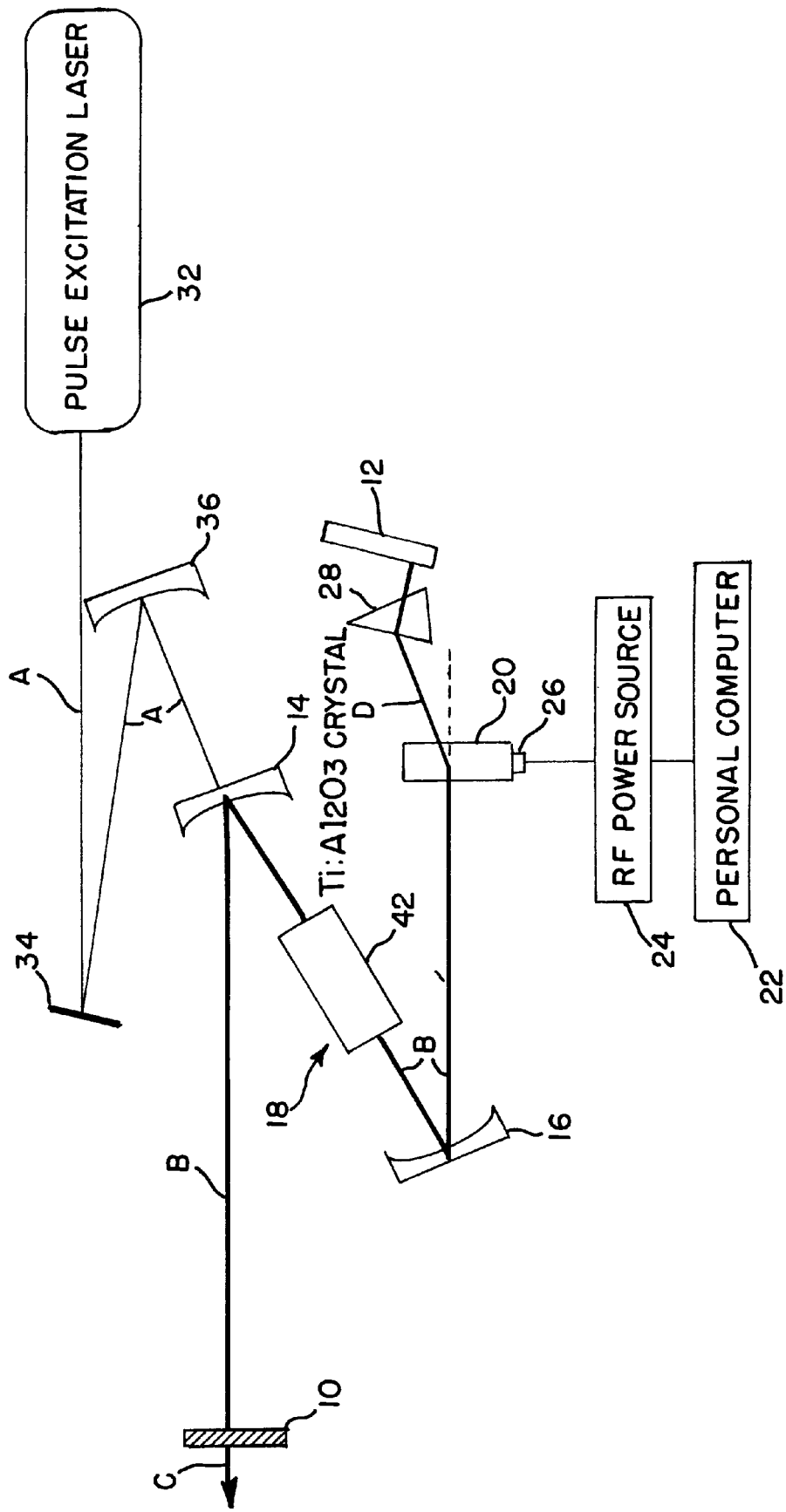
FIG. 7 is a schematic constitutional diagram for explaining a fourth manner of practice of the wavelength selectable laser oscillator in wavelength tunable laser according to the present invention.

FIG. 7 is a schematic constitutional diagram for explaining the fourth manner of practice of the wavelength selectable laser oscillator in wavelength tunable laser according to the present invention wherein the same reference characters designate the same or equivalent components as or to those of FIG. 2 showing the first manner of practice of the wavelength selectable laser oscillator in wavelength tunable laser according to the present invention, so that the detailed explanation therefore will be omitted.

The wavelength selectable laser oscillator in wavelength tunable laser of the fourth manner of practice differs from that of the first manner of practice in the point that not such an arrangement that a Ti:Al$_2$O$_3$ laser crystal 18 has been Brewster-cut, and the crystal is disposed at a Brewster angle is applied, but such an arrangement that the Ti:Al$_2$O$_3$ laser crystal 18 has been subjected to vertical incident-cutting, at the same time, a non-reflecting coating 42 has been applied, and the crystal is disposed in such that excitation laser beam A is vertically inputted is applied.

As described above, setting of the disposition of the Ti:Al$_2$O$_3$ laser crystal 18 where the excitation laser beam A is vertically inputted is easier than that of the Ti:Al$_2$O$_3$ crystal 18 where it is placed at the Brewster-angle, besides dispersion of the angle is small, so that a wide wavelength zone can be obtained.

Since the present invention has been constituted as described above, the rate of repetitive pulsed oscillation can be markedly elevated as compared with that of the prior art, besides excitation input can be reduced, and in addition, speed-up of wavelength tuning speed can be achieved, so that the invention exhibits such an excellent advantage that flexibility in case of practicing the wavelength selectable laser oscillator can be remarkably improved.

It will be appreciated by those of ordinary skill in the art that the present invention can be embodied in other specific forms without departing from the spirit or essential characteristics thereof.

The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

The entire disclosure of Japanese Patent Application No. 8-132847 filed on Apr. 30, 1996 including specification, claims, drawings and summary are incorporated herein by reference in its entirety.

What is claimed is:

1. A wavelength selectable laser oscillator in a wavelength tunable laser comprising:
    a laser resonator composed of an output mirror and a return mirror each having a prescribed reflectivity;
    a wavelength tunable laser medium disposed in said laser resonator and capable of laser oscillation in a wavelength zone of a prescribed range;
    an acousto-optical crystal disposed in said laser resonator and to which is inputted the outgoing light from said wavelength tunable laser medium;
    an acoustic wave inputting means mounted on said acousto-optical crystal and for inputting an acoustic wave to said acousto-optical crystal; and
    a pulse excitation laser for inputting an excitation laser beam into said laser resonator;
    said acousto-optical crystal having birefringent properties, and said output mirror and said return mirror of said laser resonator being arranged so as to reflect only a light component which is diffracted by said acousto-optical crystal in a specified direction, and the laser beam outputted from said mirrors on the outgoing side being utilized as the outgoing laser beam from said laser resonator.

2. A wavelength selectable laser oscillator in wavelength tunable laser as claimed in claim 1 wherein said pulse excitation laser is a highly repetitive CW-Q-switch solid state laser.

3. A wavelength selectable laser oscillator in wavelength tunable laser as claimed in claim 2 wherein said highly repetitive CW-Q-switch solid state laser is a laser-diode-excited highly repetitive solid state laser.

4. A wavelength selectable laser oscillator in wavelength tunable laser as claimed in claim 3 wherein said laser-diode-excited highly repetitive solid state laser is a CW-Q-switch pulsed Nd:YLF laser.

5. A wavelength selectable laser oscillator in wavelength tunable laser as claimed in claim 3 wherein said laser-diode-excited highly repetitive solid state laser is a CW-Q-switch pulsed YAG laser.

6. A wavelength selectable laser oscillator in wavelength tunable laser as claimed in claim 1 wherein said laser resonator is a Z-holding type laser resonator.

7. A wavelength selectable laser oscillator in wavelength tunable laser as claimed in claim 2 wherein said laser resonator is a Z-holding type laser resonator.

8. A wavelength selectable laser oscillator in wavelength tunable laser as claimed in claim 3 wherein said laser resonator is a Z-holding type laser resonator.

9. A wavelength selectable laser oscillator in wavelength tunable laser as claimed in claim 4 wherein said laser resonator is a Z-holding type laser resonator.

10. A wavelength selectable laser oscillator in wavelength tunable laser as claimed in claim 5 wherein said laser resonator is a Z-holding type laser resonator.

11. A wavelength selectable laser oscillator in a wavelength tunable laser comprising:
    a laser resonator composed of an output mirror and a return mirror each having a prescribed reflectivity;
    a wavelength tunable laser medium disposed in said laser resonator and capable of laser oscillation in a wavelength zone of a prescribed range;
    an acousto-optical crystal disposed in said laser oscillator and to which is inputted the outgoing light from said wavelength tunable laser medium;
    an acoustic wave inputting means mounted on said acousto-optical crystal and for inputting an acoustic wave to said acousto-optical crystal;
    a dispersion correcting optical element disposed in said laser resonator between an output of said acousto-optical crystal and the return mirror and for correcting dispersion of the diffracted light outputted from said acousto-optical crystal; and
    a pulse excitation laser for inputting an excitation laser beam into said laser resonator.

12. A wavelength selectable laser oscillator in wavelength tunable laser as claimed in claim 11 wherein said pulse excitation laser is a highly repetitive CW-Q-switch solid state laser.

13. A wavelength selectable laser oscillator in wavelength tunable laser as claimed in claim 12 wherein said highly repetitive CW-Q-switch solid state laser is a laser-diode-excited highly repetitive solid state laser.

14. A wavelength selectable laser oscillator in wavelength tunable laser as claimed in claim 13 wherein said laser-diode-excited highly repetitive solid state laser is a CW-Q-switch pulsed Nd:YLF laser.

15. A wavelength selectable laser oscillator in wavelength tunable laser as claimed in claim 13 wherein said laser-diode-excited highly repetitive solid state laser is a CW-Q-switch pulsed YAG laser.

16. A wavelength selectable laser oscillator in wavelength tunable laser as claimed in claim 11 wherein said laser resonator is a Z-holding type laser resonator.

17. A wavelength selectable laser oscillator in wavelength tunable laser as claimed in claim 12 wherein said laser resonator is a Z-holding type laser resonator.

18. A wavelength selectable laser oscillator in wavelength tunable laser as claimed in claim 13 wherein said laser resonator is a Z-holding type laser resonator.

19. A wavelength selectable laser oscillator in wavelength tunable laser as claimed in claim 14 wherein said laser resonator is a Z-holding type laser resonator.

20. A wavelength selectable laser oscillator in wavelength tunable laser as claimed in claim 15 wherein said laser resonator is a Z-holding type laser resonator.

21. A wavelength selectable laser oscillator in wavelength tunable laser as claimed in claim 11, wherein said wavelength tunable laser medium includes a non-reflecting coating applied to an incident end surface thereof.

22. A wavelength selectable laser oscillator in wavelength tunable laser as claimed in claim 11, wherein an excitation volume in said wavelength tunable laser medium matches an optical mode volume inside said laser resonator.

* * * * *